…

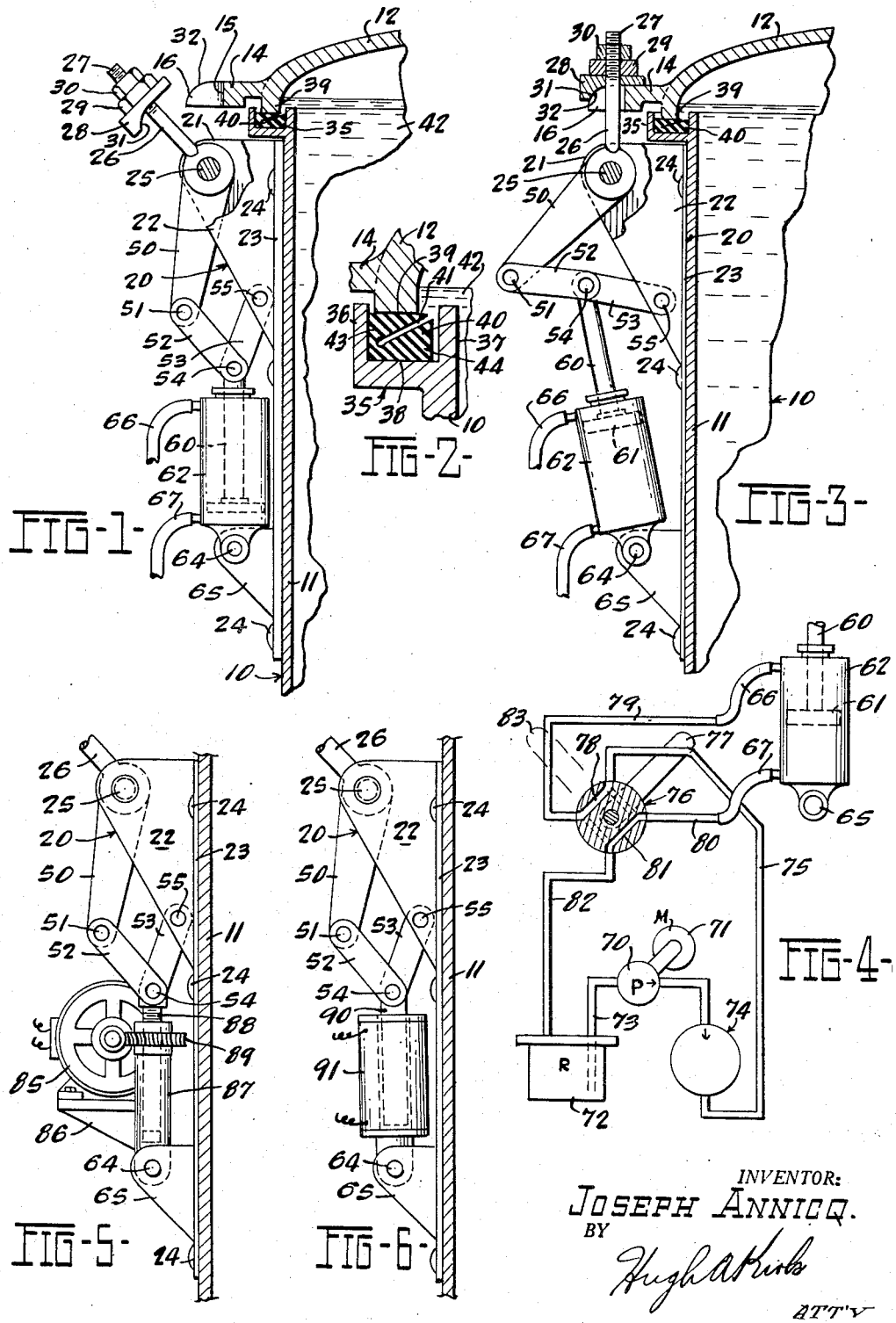

United States Patent Office 2,834,504
Patented May 13, 1958

2,834,504

PRESSURE VESSEL LOCKING MECHANISM

Joseph Annicq, Renaix, Belgium

Application November 10, 1954, Serial No. 468,105

Claims priority, application Belgium November 20, 1953

9 Claims. (Cl. 220—46)

This invention relates to a device for fastening the cover on a fluid pressure vessel. More particularly it deals with such a device which may be operated at a distance from the vessel and still effect a hermetic seal between the cover and the vessel, such as employed for liquid pressure textile dyeing.

It is an object of this invention to produce a simple, adjustable, efficient, effective and economic remotely controllable and hermetically sealing pressure vessel locking mechanism. Another object is to produce such a locking mechanism which may be remotely controlled hydraulically, pneumatically and/or electrically to lock and unlock the cover of a pressure vessel.

Another object is to provide a resilient gasket for such a vessel locking mechanism which gasket is responsive to the pressure of the fluid inside the vessel for hermetically sealing the vessel.

Generally speaking, the locking mechanism of this invention relates to the means for fastening a lid or cover on a pressure vessel or autoclave and includes a gasket between the edge of the cover and the edge of the opening of the vessel. The mechanism for fastening or locking the cover onto the vessel may comprise pivoted clamping bolts evenly spaced circumferentially around the outer edge of the opening of the vessel, which bolts may be pivoted into and out of corresponding forked nut engaging seats on the cover.

The gasket which is employed between the edges of the cover and the opening may be seated in the bottom of a trough around one edge into which trough the other edge may enter. This gasket, however, is provided with an elongated slit or channel which according to its cross section extends from the portion or corner of the gasket exposed to the fluid inside the pressure vessel into the gasket only sufficiently to be substantially between the bottom of the trough and the other edge engageable against the other side of the gasket so that the liquid pressure inside the vessel may enter the slit, slot or channel and push the sides of the gasket on opposite sides of the slit against the respective edges of the pressure vessel opening and the cover to maintain them in intimate seating and hermetic sealing engagement.

Each pivoted bolt locking, fastening, or cover holding mechanism may be operated by a series of levers, including a toggle, which in turn may be operated by a reciprocating rod moved pneumatically or hydraulically by a piston or electrically by a motor or solenoid which may be remotely controlled through a fluid system or electrical circuit, respectively. The forked seats onto which the adjustable nuts on the pivoted bolts are moved by the levers, may have cooperating cam surfaces which may even be wedge shaped to urge the lid or cover into more intimate engagement with the gasket.

The above mentioned and other features and objects of this invention and the manner of obtaining them are given more specific disclosure in the following description of embodiments of the invention, taken in conjunction with the accompanying drawing, wherein:

Figure 1 is a side elevation of one embodiment of this invention adapted to a fluid operated locking mechanism as it may be mounted on the side of a pressure vessel, showing in vertical section only a part of the vessel and its cover against a gasket, with the pivoted bolt mechanism in its open position;

Figure 2 is an enlarged vertical sectional view of the gasket in cooperation with the edges of the cover and pressure vessel as shown in Figure 1;

Figure 3 is a view similar to that shown in Figure 1 but with the bolt locking mechanism in its cover locking position;

Figure 4 is a schematic diagram of a remote fluid control system for fluid operating mechanisms of the type shown in Figures 1 and 3;

Figure 5 is another embodiment of the locking mechanism shown in Figure 1 adapted to be controlled by an electric motor; and Figure 6 is still another embodiment of the locking mechanism shown in Figure 1 adapted to be controlled by an electric solenoid.

The pressure vessel 10 herein disclosed is shown to be a vertically cylindrical vessel having a side wall 11 and an open top covered by removable domed lid 12. Around the outer periphery of the cover 12 there may be located a plurality of outwardly extending fork members 14, having central slots 15 between the two tines 16 of the fork 14, one of which fork members 14 is shown vertically sectioned in Figures 1 and 3.

Corresponding to each of the forked members 14 around the cover 12 there may be located a bracket member 20 which may have a pair of parallel outwarding projecting plate members 21 and 22 mounted on a flanged plate 23 at right angles thereto, which plate may be riveted, welded or bolted to the side 11 of the vessel by suitable fastening means 24. So that the cover 12 may be secured and held in position over the open end of the vessel 10, the slots 15 in the peripherally extending fork members 14 should be vertically aligned with the space between the parallel projecting plates 21 and 22, which plates support a pivot shaft 25 on which is mounted the head end of the fastening bolt 26. These bolts 26 thus may be swung around their pivots 25 from their open position as shown in Figure 1 to that of their closed or locking position as shown in Figure 3 for holding the cover 12 onto the vessel 10. The outer ends of the pivoted bolts 26 are preferably threaded at 27 for supporting a shoe engaging member 28 which may be rotatably fastened to a nut 29 screwed on the bolt threads 27 and may be locked in position by a lock nut 30. The lower face of the shoe 28 may be provided with a cammed or contoured surface 31 to fit a correspondingly cammed or contoured upper face 32 of the two tines 16 of the forked member 14, so that when a bolt 26 is in its locking position as shown in Figure 3, the surfaces 31 and 32 are in intimate contact with each other, and may even urge or wedge the cover 12 downwardly into closer contact with the edge of the opening of the vessel 10.

One of the edges of the opening to the vessel 10 and of the cover 12, herein the edge of the opening of the vessel 10, is provided with an integral trough 35 (see also Figure 2) having parallel sides 36 and 37 and a bottom 38, which sides 36 and 37 are spaced farther apart than the thickness or width of the lower edge 39 of the cover 12. Between the edge 39 of the cover 12 and the bottom 38 of the trough 35 is located a gasket 40 of resilient material such as natural or synthetic rubber or other resilient plastic gasket type of material. The gasket 40 herein is shown to have a substantially rectangular cross section from the upper inner corner of which a normally open slot, slit, or channel 41 extends into the body of the gasket short of the opposite side of the gasket, but sufficient to be between the edge 39 and the bottom 38, so that a fluid or liquid 42 under pressure from the inside of the pressure vessel 10 when the lid is in closed position may enter the open end of the slot 41 and by the pressure inside the vessel 10 spread the slot 41 so that the upper portion 43 of the gasket 40 will be pressed against the lower edge 39 of the cover 12 and simultaneously the lower portion 44 of the gasket 40 will be pressed against the bottom 38 of the trough, thereby forming a fluid tight or hydraulic pressure seal between the opening of vessel 10 and the cover 12, while the cover 12 is maintained in its closed position by means of the bolts 26 in their locking position shown in Figure 3. Thus, as long as the bolts 26 with their shoes 28 are adjusted so that the cover 12 cannot be raised from the vessel 10 by pressure inside the vessel, the greater the pressure inside the vessel the more pressure will be applied to the portions 43 and 44 from the slot 41 in the gasket member 40 to increase the sealing between the cover and opening of the vessel. Accordingly, it is not necessary to separately tighten the nuts 29 on each of the bolts 26 around the cover 12 of the vessel 10 if these nuts 29 have previously been properly adjusted to hold the cover 12 in the position shown in Figure 3, in that the application of pressure to the vessel 10 thereafter through ducts not shown here connected to the vessel will maintain a liquid tight seal at the joint between the cover and the edge of the opening of the vessel because of the action of gasket 40 just described.

The bolts 26 may be swung into position by a mechanical means which may be controlled through a system at a distance from the vessel, if desired. Such mechanical means may comprise a lever arm 50 which may be fixed to rotate with the bolt 26 on the pivot shaft 25, or both the bolt 26 and lever 50 may be fixed to the axis shaft 25 which shaft is free to rotate in the members 21 and 22 of the bracket 20. The outer or lower end of the lever 50 may be provided with a pivot 51 to which may be connected in series a pair of toggle links 52 and 53 pivoted together at 54 with the link 53 pivoted to a fixed pivot shaft 55, which pivot shaft 55 also may be mounted on the bracket member 20.

For operating the toggle links 52 and 53 to oscillate the lever 50 from the position shown in Figure 1 to that shown in Figure 2, there may be connected to the interconnecting pivot 54 between the links 52 and 53 a reciprocating rod 60. In the embodiment of Figures 1 and 2 this rod 60 may be directly connected to a piston 61 within a pneumatic or hydraulic motor cylinder 62, which cylinder may be pivoted on a stub shaft 64 at its opposite end to a supporting member 65. This member 65 may extend from the base plate 23 below and parallel to the members 21 and 22 of the bracket 20 or it may be mounted separately to the side wall 11 of the vessel 10. This pivot shaft 64 permits oscillation of the cylinder 62 as it operates its piston 60 to move over the arc described by the pivot 54 between the links 52 and 53 as the levers move from their open position shown in Figure 1 to their closed or locking position for the bolts 26 shown in Figure 3. The movements between these positions may be controlled through a pair of flexible fluid conducting hoses 66 and 67 connected to the opposite ends of the cylinder 62 to permit an operating fluid alternately to be introduced to and exhausted from opposite sides of the piston 61 within the cylinder 62.

A schematic diagram of the controlling system for operating a pneumatic or hydraulic cylinder 62 is shown in Figure 4 which may comprise a fluid pressure pump 70 operated by a power source 71. The type of fluid employed may either be a compressed gas such as air or it may be a liquid such as water, oil or even a part of the fluid or liquid 42 employed inside the vessel. The pump 70 may suck the fluid to be compressed for operating the cylinder 62 from a reservoir 72 through a conduit 73 into the pump 70 and thence into a pressure accumulating reservoir 74 which may be maintained automatically at a given pressure to uniformly control the cylinder 62.

From this pressure reservoir 74 the pressurized fluid may be conducted through a conduit 75 to a two-way hydraulic valve 76 which may be manually controlled by means of a lever 77, herein shown in its full line position to correspond to the retraction of the piston 61 or opening of the bolt locking device for the pressure vessel as shown in Figure 1. The pressurized operating fluid is accordingly conducted through the duct 78 in the valve 76 and thence through a conduit 79 and/or connected flexible hose 66 to the upper portion of the cylinder 62, while correspondingly the fluid now to be exhausted from the lower portion of the cylinder 62 on the other side of the piston 61 is conducted through flexible hose 67, conduit 80, duct 81 in the valve 76, and conduit 82 back to the reservoir 72. If the manual lever 77 of the valve 76 is thrown into its dotted line position 83, pressure conduit 75 is then connected through the conduit 80 and flexible hose 67 to the lower portion of the cylinder 62 and the piston 61 is then extended into the position shown on Figure 3 to move the locking bolts 26 into their locking position.

Since the lever 50 and toggle links 52 and 53 may be operated by any reciprocating rod or member 60, this movement may be also controlled electrically. One such control is by an electric motor 85 as shown in the embodiment of Figure 5 wherein the motor is mounted on a tiltable table 86 pivoted to the stub shaft 64 on the supporting member 65, together with a guide sleeve 87 into which a threaded reciprocating rod 88 telescopes. The motor 85 is reversible and drives a worm gear 89 threaded on the rod 88 to alternately reciprocate the rod 88 which is shown in its retracted position in Figure 5.

Instead of using an electric motor, the lever 50 and links 52 and 53, may be operated by the reciprocating armature 90 (see Fig. 6) of a solenoid 91 pivotally mounted to the stub shaft 64 on supporting members 65.

In both the electrically controlled mechanisms shown in Figures 5 and 6, an electric energy source may be connected through a circuit having a conventional double-pole double-throw reversing switch (not shown), which may be located at a remote point. Usually pressure vessels of the type herein shown are provided with a plurality of pivoted locking bolts 26, and accordingly a plurality of operating mechanisms such as cylinder 62, motors 85 or solenoids 91 are provided, one for each one of the bolts located around the vessel, all of which mechanisms may be controlled simultaneously by connecting them in parallel with the conduits 79 and 80 of the pneumatic or hydraulic system of Figure 4, or connecting them electrically in parallel with the electrical conductors connected to the motors 85 or solenoids 91.

While there is described above the principles of this invention in connection with specific apparatus, it is to be clearly understood that this description is made only by way of example and not as a limitation to the scope of this invention.

What is claimed is:

1. A locking device for fastening the edges of two members together, comprising: a pivot support mounted on one of said members near its edge with its pivotal axis parallel to said edge, a forked extension having two tines mounted on the other of said members near its edge and projecting adjacent said pivot support, a bell crank type primary lever pivoted on said pivot support, one arm of said lever movable between said tines and having an enlarged means thereon for engagement with the opposite side of said tines from said pivot for said lever, a pair of toggle links connected between the other arm of said lever and said support, a second pivot mounted on said support for connecting said toggle thereto, and reciprocating motor means connected to the pivot between said pair of toggle links to move said toggle to and from its dead center position and to move said one arm of said lever between and away from said tines to lock and unlock said two members, respectively.

2. A locking device according to claim 1 wherein said enlarged means on said one arm includes means for adjusting it toward and away from the pivot for said arm.

3. A locking device according to claim 1 wherein said enlarged means comprises a shoe, and said opposite side of said tines has a cam engaging face which co-operates with said shoe.

4. A locking device according to claim 1 including a self-sealing gasket between said edges of said two members.

5. A device according to claim 4 wherein said self-sealing gasket means comprises a resilient material provided with a slot opening toward the inside of said vessel and extending between the edges of said cover and said opening, whereby pressure inside said vessel transmitted into said slot spreads said gasket to form a hermetic seal between the edges of said opening and said cover.

6. A device according to claim 1 wherein said reciprocating motor means comprises a reciprocating piston in a fluid motor cylinder and a reversible fluid pressure system for operating said piston.

7. A device according to claim 1 wherein said reciprocating motor means comprises a worm gear driven by an electric motor and a reciprocating screw driven by said worm gear connected to said toggle, and an electric circuit for reversibly controlling the operation of said motor.

8. A device according to claim 1 wherein said reciprocating motor means comprises a reciprocating armature of a solenoid connected to said toggle and an electrical circuit for reversibly operating said solenoid.

9. A device according to claim 1 including a plurality of said extensions and cooperating lever arms along the edges of said two members, and means for simultaneously operating all said reciprocating motor means for operating said lever arms.

References Cited in the file of this patent

UNITED STATES PATENTS

| | | |
|---|---|---|
| 709,607 | Podlesak | Sept. 23, 1902 |
| 863,001 | Seebeck | Aug. 13, 1907 |
| 904,275 | Peckham | Nov. 17, 1908 |
| 1,047,588 | Stull | Dec. 17, 1912 |
| 1,469,070 | Jacobs | Sept. 25, 1923 |
| 1,579,672 | Strecker | Apr. 6, 1926 |
| 1,796,724 | Rigby | Mar. 17, 1931 |
| 2,157,983 | Glougie | May 9, 1939 |
| 2,160,062 | Drake et al. | May 30, 1939 |
| 2,245,252 | Cleghorn | June 10, 1941 |
| 2,523,760 | Hayner | Sept. 26, 1950 |
| 2,647,789 | Chayne | Aug. 4, 1953 |
| 2,734,824 | De Luca | Feb. 14, 1956 |

FOREIGN PATENTS

| | | |
|---|---|---|
| 93,697 | Germany | Sept. 8, 1897 |
| 18,001 | Austria | Oct. 25, 1904 |
| 595,332 | France | July 13, 1925 |
| 164,368 | Switzerland | Dec. 16, 1933 |
| 412,700 | Great Britain | July 5, 1934 |